US012135951B2

United States Patent
Zhang et al.

(10) Patent No.: US 12,135,951 B2
(45) Date of Patent: Nov. 5, 2024

(54) INTERPRETING CROSS-LINGUAL MODELS FOR NATURAL LANGUAGE INFERENCE

(71) Applicant: NEC Laboratories America, Inc., Princeton, NJ (US)

(72) Inventors: Xuchao Zhang, Elkridge, MD (US); Bo Zong, West Windsor, NJ (US); Haifeng Chen, West Windsor, NJ (US); Yanchi Liu, Monmouth Junction, NJ (US)

(73) Assignee: NEC Corporation, Tokyo (JP)

( * ) Notice: Subject to any disclaimer, the term of this patent is extended or adjusted under 35 U.S.C. 154(b) by 370 days.

(21) Appl. No.: 17/582,464

(22) Filed: Jan. 24, 2022

(65) Prior Publication Data

US 2022/0237391 A1     Jul. 28, 2022

Related U.S. Application Data

(60) Provisional application No. 63/143,277, filed on Jan. 29, 2021, provisional application No. 63/141,011, filed on Jan. 25, 2021.

(51) Int. Cl.
*G06F 40/58* (2020.01)
*G06F 40/284* (2020.01)
*G06F 40/30* (2020.01)

(52) U.S. Cl.
CPC ............ *G06F 40/58* (2020.01); *G06F 40/284* (2020.01); *G06F 40/30* (2020.01)

(58) Field of Classification Search
CPC ........ G06F 40/58; G06F 40/284; G06F 40/30; G06F 3/167; G10L 15/183; G10L 15/22;
(Continued)

(56) References Cited

U.S. PATENT DOCUMENTS 11,449,685 B2 *   9/2022   De Peuter ................ G06N 3/08
2019/0056908 A1 *   2/2019   Zabetian ............... G06F 3/0482
(Continued)

FOREIGN PATENT DOCUMENTS

WO     WO-2022020467 A1 *   1/2022          G06F 40/284

OTHER PUBLICATIONS

Mikolov et al., "Efficient Estimation of Word Representations in Vector Space", arXiv:1301.3781v3 [cs.CL] Sep. 7, 2013, pp. 1-12.
(Continued)

*Primary Examiner* — Mohammad K Islam
(74) *Attorney, Agent, or Firm* — Joseph Kolodka

(57) ABSTRACT

Systems and methods are provided for Cross-lingual Transfer Interpretation (CTI). The method includes receiving text corpus data including premise-hypothesis pairs with a relationship label in a source language, and conducting a source to target language translation. The method further includes performing a feature importance extraction, where an integrated gradient is applied to assign an importance score to each input feature, and performing a cross-lingual feature alignment, where tokens in the source language are aligned with tokens in the target language for both the premise and the hypothesis based on semantic similarity. The method further includes performing a qualitative analysis, where the importance score of each token can be compared between the source language and the target language according to a feature alignment result.

12 Claims, 6 Drawing Sheets

(58) Field of Classification Search
CPC . G10L 15/25; G10L 2015/223; G06V 40/165; H04R 1/406; H04R 3/005
See application file for complete search history.

(56) References Cited

U.S. PATENT DOCUMENTS

| | | | | |
|---|---|---|---|---|
| 2020/0134026 | A1* | 4/2020 | Lovitt | G10L 15/22 |
| 2020/0401938 | A1* | 12/2020 | Etkin | G16H 50/30 |
| 2021/0174032 | A1* | 6/2021 | De Peuter | G06N 5/02 |
| 2021/0294970 | A1* | 9/2021 | Bender | G06F 40/20 |
| 2022/0296966 | A1* | 9/2022 | Asikainen | G16H 20/30 |
| 2022/0366143 | A1* | 11/2022 | Zhang | G06F 40/295 |

OTHER PUBLICATIONS

Mikolov et al., "Distributed Representations of Words and Phrases and their Compositionality", arXiv:1310.4546v1 [cs.CL] Oct. 16, 2013, pp. 1-9.

Tsutsui et al., "Using Artificial Tokens to Control Languages for Multilingual Image Caption Generation", arXiv:1706.06275v1 [cs. CV] Jun. 20, 2017, pp. 1-4.

Zhang et al., "Axiomatic Interpretability for Multiclass Additive Models", arXiv:1810.09092v2 [cs.LG] May 30, 2019, pp. 1-9.

Chandrasekaran et al., "Evolution of Semantic Similarity—A Survey", arXiv:2004.13820v2 [cs.CL] Jan. 30, 2021, pp. 1-35.

Boukkouri et al., "CharacterBERT: Reconciling ELMo and BERT for Word-Level Open-Vocabulary Representations From Characters", arXiv:2010.10392v3 [cs.CL] Oct. 31, 2020, pp. 1-13.

Hazra et al., "Zero-Shot Generalization using Intrinsically Motivated Compositional Emergent Protocols", arXiv:2105.05069v1 [cs.AI] May 11, 2021, pp. 1-5.

Hu et al., "Investigating Transfer Learning in Multilingual Pre-trained Language Models through Chinese Natural Language Inference", arXiv: 2106.03983v1 [cs.CL] Jun. 7, 2021, pp. 1-18.

Qi et al., "Translation-Based Matching Adversarial Network for Cross-Lingual Natural Language Inference", in Proceedings of the AAAI Conference on Artificial Intelligence Apr. 3, 2020 (vol. 34, No. 05, pp. 8632-8639).

Lee et al., "Efficient L1 Regularized Logistic Regression", in Aaai Jul. 16, 2006 (vol. 6, pp. 401-408).

Chen et al., "A Unified Model forWord Sense Representation and Disambiguation", in Proceedings of the 2014 Conference on Empirical Methods in Natural Language Processing (EMNLP) Oct. 2014 (pp. 1025-1035).

Zou et al., "Bilingual Word Embeddings for Phrase-Based Machine Translation", inProceedings of the 2013 conference on empirical methods in natural language processing Oct. 2013 (pp. 1393-1398).

Melamud et al., "Learning Generic Context Embedding with Bidirectional LSTM", inProceedings of the 20th SIGNLL conference on computational natural language learning Aug. 2016 (pp. 51-61).

Conneau et al., "Cross-lingual Language Model Pretraining", 33rd Conference on Neural Information Processing Systems (NeurIPS 2019), Jan. 22, 2019, pp. 1-11.

Vaswani et al., "Attention Is All You Need", 31st Conference on Neural Information Processing Systems (NIPS 2017), Dec. 2017, pp. 1-11.

Han et al., "Samsung: Align- and-Differentiate Approach to Semantic Textual Similarity", inProceedings of the 9th International Workshop on Semantic Evaluation (SemEval 2015) Jun. 2015 (pp. 172-177).

Bowman et al., "A large annotated corpus for learning natural language inference", arXiv preprint arXiv:1508.05326. Aug. 21, 2015, pp. 1-11.

Katharina Waschle, "Quantifying Cross-lingual Semantic Similarity for Natural Language Processing Applications", Jun. 2015, (Doctoral dissertation), pp. 1-139.

\* cited by examiner

INTERPRETING CROSS-LINGUAL MODELS FOR NATURAL LANGUAGE INFERENCE

RELATED APPLICATION INFORMATION

This application claims priority to U.S. Provisional Application No. 63/141,011, filed on Jan. 25, 2021, and U.S. Provisional Application No. 63/143,277, filed on Jan. 29, 2021, both incorporated herein by reference in their entirety.

BACKGROUND

Technical Field

The present invention relates to cross-lingual models for natural language inference, and more particularly interpreting cross-lingual models for natural language inference (NLI).

Description of the Related Art

Generic word embeddings capture semantic and syntactic information about individual words in a compact low-dimensional representation.

Zero Shot Learning (ZSL) is a problem setup in machine learning, where at testing, a learner observes samples from classes that were not observed while training the model and predicts the category they belong to. While training, the aim is to find a projection function from visual space to semantic space (that is, word vectors or semantic embedding) using information from seen categories. Since neural networks are used as function approximators, the projection function is learned as a deep neural network. A deep network that has only learned to map seen category image features to semantic space during training might not be able to do the same for the novel non-observed category at the testing phase correctly.

A zero-shot text classification model is trained on Natural Language Interface (NLI). Text classification is the process of categorizing the text into a set of words. By using NLI, text classification can automatically perform text analysis and then assign a set of predefined tags or categories based on its context. Natural Language Inference (NLI) involves determining the inference relation between two texts, that may be entailment, contradiction, or neutral. Named-entity recognition (NER) can locate and classify named entities mentioned in unstructured text into pre-defined categories, for example, the name of a person, an organization (e.g., company, government), locations, time, and monetary values, etc.

Semantic similarity methods can provide a ranking or percentage for the similarity between texts. Semantics of words that can be inferred from the finer context of its location in a sentence and its relations with neighboring words. Similarity can be measured in terms of semantic distance.

Feature importance describes how important the feature was for the classification performance of the model. It can be a measure of the individual contribution of the corresponding feature to the particular classifier. However, a feature important for one model may be unimportant for another model.

Recurrent models typically factor computation along the symbol positions of the input and output sequences. Aligning the positions to steps in computation time, they generate a sequence of hidden states $h_t$, as a function of the previous hidden state $h_{t-1}$ and the input for position t. A Transformer is a model architecture without recurrence that instead relies entirely on an attention mechanism to draw global dependencies between input and output.

SUMMARY

According to an aspect of the present invention, a method is provided for Cross-lingual Transfer Interpretation (CTI). The method includes receiving text corpus data including premise-hypothesis pairs with a relationship label in a source language, and conducting a source to target language translation. The method further includes performing a feature importance extraction, where an integrated gradient is applied to assign an importance score to each input feature, and performing a cross-lingual feature alignment, where tokens in the source language are aligned with tokens in the target language for both the premise and the hypothesis based on semantic similarity. The method further includes performing a qualitative analysis, where the importance score of each token can be compared between the source language and the target language according to a feature alignment result.

According to another aspect of the present invention, a computer system for Cross-lingual Transfer Interpretation (CTI) is provided. The computer system includes a processor, a display operatively coupled to the processor, computer memory operatively coupled to the processor, and a comparator stored in the computer memory, wherein the comparator is configured to receive text corpus data including premise-hypothesis pairs with a relationship label in a source language, conduct a source to target language translation, perform a feature importance extraction, where an integrated gradient is applied to assign an importance score to each input feature, perform a cross-lingual feature alignment, where tokens in the source language are aligned with tokens in the target language for both the premise and the hypothesis based on semantic similarity, wherein the semantic similarity is measured using the cosine similarity, $$sim(s_i, t_j) = \frac{e_{s_i}^T e_{t_j}}{\|e_{s_i}\| \|e_{t_j}\|},$$

where T is the transpose of the vector, and where $e_{si}$ and $e_{tj}$ are embeddings of $s_i$ and $t_j$ in such a shared semantic space, and perform a qualitative analysis, where the importance score of each token can be compared between the source language and the target language according to a feature alignment result.

According to yet another aspect of the present invention, a computer program product for Cross-lingual Transfer Interpretation (CTI) is provided. The computer program product includes a computer readable storage medium having program instructions embodied therewith, wherein the program instructions executable by a computer, cause the computer to receive text corpus data including premise-hypothesis pairs with a relationship label in a source language; conduct a source to target language translation; perform a feature importance extraction, where an integrated gradient is applied to assign an importance score to each input feature; perform a cross-lingual feature alignment, where tokens in the source language are aligned with tokens in the target language for both the premise and the hypothesis based on semantic similarity; and perform a qualitative analysis, where the importance score of each token can be compared between the source language and the target language according to a feature alignment result.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
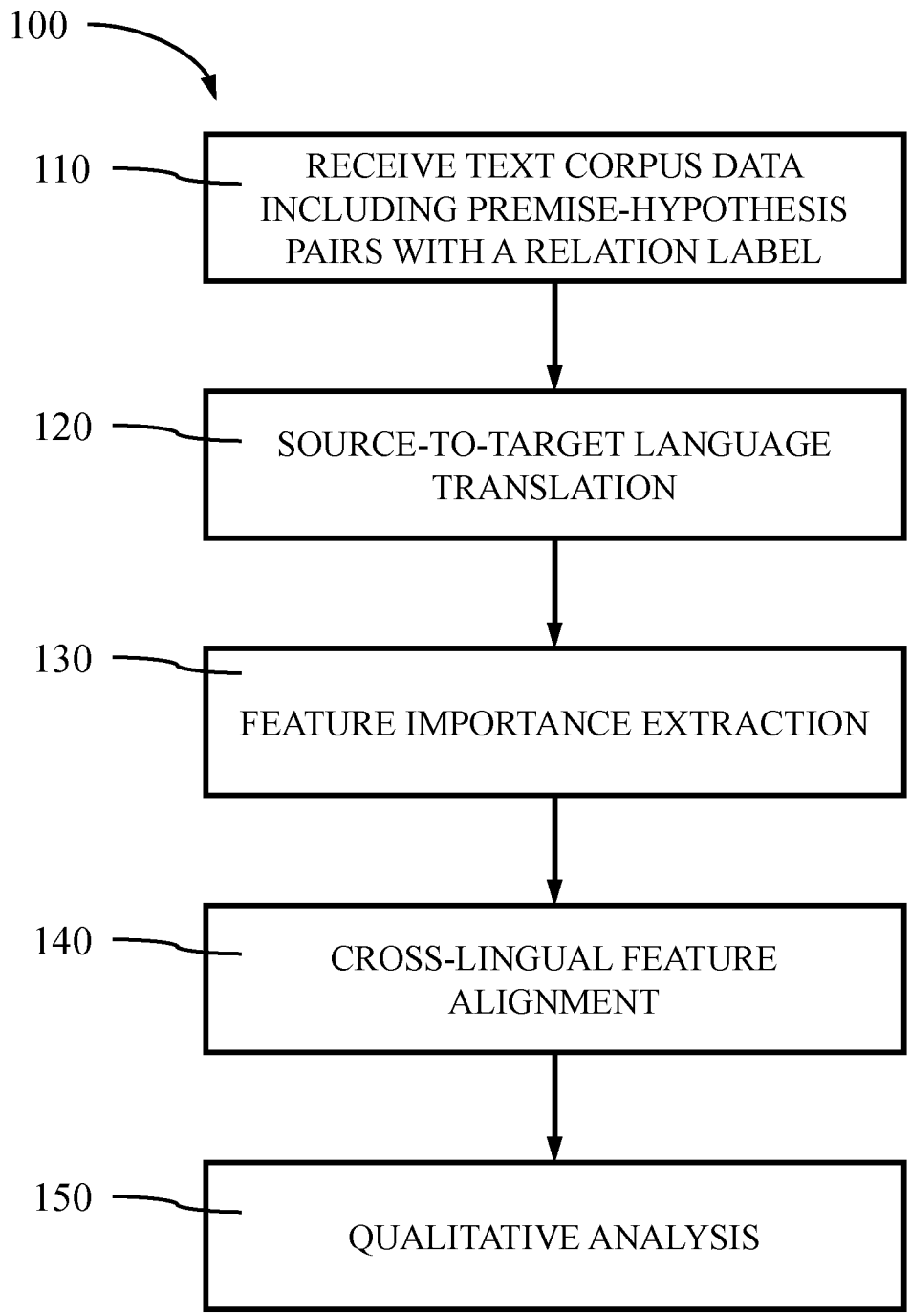
FIG. 1 is a block/flow diagram illustrating a high-level system/method for Cross-lingual Transfer Interpretation (CTI), in accordance with an embodiment of the present invention.

In accordance with embodiments of the present invention, systems and methods are provided for natural language processing (NLP) learning a language model on high-resource languages (e.g., English), and adapting the model to a low-resource languages (i.e., languages where training samples are limited). A Cross-lingual Transfer Interpretation method (CTI) can be used to address the Cross-Lingual Zero-Shot question and answer (QA) problems. The cross-lingual transfer capability of handling an NLI task in a target language with the training samples in a source language can be explained.

In one or more embodiments, a multi-lingual transformer model is provided, where the model can achieve state-of-the-art performance on several cross-lingual NLP tasks, such as Cross-lingual Natural Language Inference (XNLI), Named Entity Recognition (NER) and Question Answering (QA). In various embodiments, the translated premises and hypotheses in 14 different languages can be utilized to obtain feature importance scores by the Local Interpretable Model-agnostic Explanations (LIME) explainer for each language. Feature scores can be aligned to words with similar semantics between source and target languages. The corresponding XNLI dataset can include 15 languages: English, Arabic, Bulgarian, German, Greek, Spanish, French, Hindi, Russian, Swahili, Thai, Turkish, Urdu, Vietnamese, and Chinese.

The performance of the cross-lingual transformed-based models can be significantly different for a variety of downstream tasks, and the performance of such models can fluctuate across languages in the same downstream task.

Cross-lingual models may perform poorly due to misunderstanding of downstream tasks. In order to quantitatively measure explanations, the attributions of input tokens to predictions of cross-lingual models can be assessed, and a novel measure is proposed to align attributions of semantically similar tokens across languages.

In various embodiments, a parallel corpus on the downstream task of interest can be prepared, and then the attributions of tokens are extracted by the Integrated Gradients (IG). Next embeddings of tokens can be aligned with similar semantics by the cosine similarity metric. A new transfer score can be used to measure aligned cross-lingual attributions by optimizing a linear programming problem. An evaluation framework can be used to measure the transfer score of attributions across languages by aligning attributions of tokens with similar semantics.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

Referring now in detail to the figures in which like numerals represent the same or similar elements and initially to FIG. 1, a block/flow diagram illustrating a high-level system/method for Cross-lingual Transfer Interpretation (CTI) is illustratively depicted in accordance with one embodiment of the present invention.

In one or more embodiments, a method for Cross-lingual Transfer Interpretation (CTI) 100 can prepare and evaluate the attribution transferability of a cross-lingual model.

In one or more embodiments, the framework to evaluate the attribution transferability of a cross-lingual model can include preparing parallel corpus for an evaluation task. Attributions of tokens can be extracted from the source language and the target language, respectively, and cross-lingual token embeddings can be aligned. The token encoder of a model encodes discrete token IDs into continuous differentiable representations. The attribution transferability can then be measured. For cross-lingual transformer-based models, its embedding layer provides meaningful encoding information of token IDs. The embedding layer can contain higher portions of parameters than any other layer.

In various embodiments, the results can be used as the interpretation for people to judge the output generated by a cross-lingual model and decide whether to use the output in some real-world application. The model can be further improved by a more advanced token attribution quantification module and attribution consistency algorithm.

At block 110, a natural language inference corpus with only source language (e.g., English) training data is provided. The text corpus data can include a set of premise-hypothesis pairs. For each pair, the NLI task is to determine whether a hypothesis is true (entailment), false (contradiction), or undetermined (neutral) given a premise. The premise and hypothesis are each statements that can be about a scene or scenario.

In various embodiments, a prepared parallel corpus is used to compare attributions of tokens on different languages. Specifically, sentences can be generated within NLP tasks of interest from the source language and then translated into sentences of the target language.

For example, given an NLI corpus in the source language such as English, a goal is to explain the cross-lingual transfer ability to target language (capability of handling an NLI task in target language without training samples).

At block 120, a Source-Target Language Translation is conducted, where both the hypothesis statements and premise statements are translated from the source language to a target language by a machine translation service. After using the machine translation, a manual (i.e., human) check of the translation(s) can be performed and revisions made based on the human suggestions.

Sentences within NLP tasks of interest can be generated from the source language, and then translated into sentences of a target language.

At block 130, a Feature Importance Extraction is performed, where an axiomatic model interpretability algorithm, such as integrated gradients, can be applied to assign an importance score to each input feature by approximating the integral of gradients of model's output.

In various embodiments, the hypothesis and premise can be formatted as: [Tokens of premise]<SEP> [Tokens of hypothesis]. Each token in a premise and a hypothesis can be assigned an importance score to indicate the contribution of the feature to the final output.

To understand what role each token in the sentences plays on predictions, attributes of predictions with regard to input tokens can be measured. While many existing methods provide attribute measures, Integrated Gradients (IG) can be employed to follow the axioms of attribution methods: it utilizes the change of prediction gradient from an input to its baseline to evaluate attributions.

Given any input vector $x \in \mathbb{R}^d$, its baseline $x' \in \mathbb{R}^d$, and a prediction function F, the idea of IG is to measure how the gradient $\partial F/\partial x$ along the path from x' to x changes, which is mathematically formulated as:

$$IG_i = (x - x') \times \int_{\alpha=0}^{1} \frac{\partial F(x' + \alpha(x - x'))}{\partial d\alpha}; \quad (1)$$

where $x_i$ is the i-th dimension of x. Obviously, as a increases from 0 to 1, the path starts from x to x, and IG integrates the gradient $\partial F/\partial x$ along the path. Equation (1) requires the differentiability of the prediction F with regard to the input x. However, the input of a cross-lingual model is a vector of token IDs, which are non-differentiable. To address this issue, the token encoder of a model encodes discrete token IDs into continuous differentiable representations.

For a cross-lingual transformer-based model, its embedding layer provides meaningful encoding information of token IDs. Moreover, this embedding layer can contain higher portions of parameters than any other layer.

In various embodiments, the baseline of Equation (1) is chosen as follows: we maintain all separation tokens in a sentence, and replace other tokens in this sentence with padding tokens. Let d be the dimensionality of representation of all tokens on the embedding layer. Given any input text s and t from the source language and the target language, respectively, attributions of $s_i$ and token $t_j$ are represented as $w_{si}$ and $w_{tj}$, respectively, where $s_i$ and $t_j$ are the i-th token and the j-th token of s and j, respectively. $w_{si}$ and $w_{tj}$ aggregate all IGs along the dimensionality of token representations, which are shown as follows:

$$w_{si} = \Sigma_{k=1}^{d} IG_k(s_i), \; w_{tj} = \Sigma_{k=1}^{d} IG_k(t_j).$$

At block 140, a Cross-Lingual Feature Alignment can be performed, where the tokens in the source language can be aligned to the target language for both the premise and the hypothesis based on their semantic similarity. The alignment can be based on the semantic similarity between tokens in the source language and the target language. The semantic representation should ensure the embeddings are aligned in the same semantic space.

Cross-lingual models usually provide contextual token representations (i.e. the context may affect representations), and therefore tokens are poorly aligned in the token spaces. To address this issue, tokens tokenized by cross-lingual models are aligned to a context-free tokenizer in the shared space of vocabularies, which provide consistent token embeddings. Embeddings of $s_i$ and $t_j$ are represented by $e_{si}$ and $e_{tj}$, respectively, and they are compared by the cosine similarity metric, which is shown as follows:

$$sim(s_i, t_j) = \frac{e_{s_i} T e_{t_j}}{\|e_{s_i}\| \|e_{t_j}\|},$$

where T is the transpose of the vector.

This equation is to compute the cosine similarity between the source language token $s_i$ and target language token $t_j$. $e_{s_i}$ is the embedding representation of a source token and $e_{t_j}$ is the embedding representation of a target token.

Using the cosine similarity metric, we can align tokens between different languages. It is worthwhile to notice that every token from the source language may match multiple tokens from the target language, and vice versa.

To address this issue, the transfer score of cross-lingual attributions can be maximized by optimizing the following objective:

$$C(s,t) = \max \Sigma_{i=1, s_i \in s}^{L} \Sigma_{j=1, t_j \in t}^{L} f_{i,j} \, sim(s_i, t_j);$$

$$s.t. \; \Sigma_{j=1} f_{i,j} \leq \overline{w}_{s_i} (i=1, \ldots, L);$$

$$\Sigma_{i=1}^{L} f_{i,j} \leq \overline{w}_{t_j} (j=1, \ldots, L), f_{i,j} \geq 0; \quad (2),$$

where s.t. means "subject to", it's usually used to provide some constraints for optimization problem;

where C(s, t) is defined as the transfer score of cross-lingual attributions, and L is the maximal length of a sentence. The higher value C(s, t) has, the better transferability of attributions it is equipped with. Transfer weight $f_{i,j}$ quantifies the attribution transferred from token $s_i$ to token $t_j$. The inequality constraints protect the sums of transfer weight $f_{i,j}$ from surpassing attributions $w_{si}$ and $w_{tj}$. Equation (2) is a simple linear programming problem that can be solved.

C(s, t) is the consistency of token attributions, and L is the maximal length of sentences, s and t. $w_{si}$ and $w_{tj}$ are denoted as the normalized values of $w_{si}$ and $w_{tj}$, respectively, or namely $\Sigma s_i \in s \; ws_i = 1$, $wsi \geq 0$, $\Sigma tj \in t \; wtj = 1$, $wtj \geq 0$.

The weight $f_{i,j}$ quantifies the consistency of token attributions from $s_i$ to $t_j$. The larger C(s, t) is, the more likely multi-lingual Pre-trained Language Models (PLMs) attach equal importance to multi-lingual synonyms. Multi-lingual PLMs attach different attributions to multi-lingual synonyms.

At block 150, a Qualitative Analysis can be performed, where the importance score of each token can be compared between source language and target language according to the feature alignment result. The relation between source language features and target language features can be quantitively and qualitatively interpreted. The XNLI task can infer the logical relation between a premise and a hypothesis (i.e., entailment, neutral or contradiction) across languages.

In various embodiments, to understand what role each token in the sentences plays on predictions, attributes of predictions with regard to input tokens can be measured using Integrated Gradients (IG). Integrated Gradients (IG) utilizes the change of prediction gradient from an input to its baseline to evaluate attributions. IG is used to measure how the gradient $\partial F/\partial x$ along the path from x' (i.e., baseline) to x (i.e., input vector) changes. IG integrates the gradient $\partial F/\partial x$ along the path.

Specifically, if there is an input sample as a list of source language tokens as $s_1, s_2, \ldots, s_m$ and target language tokens as $t_1, t_2, \ldots, t_n$, the feature (token) alignments can be represented as two set of token indices for source and target language. For example, $\Psi$ and $\Phi$ can be used to represent the indices of aligned pairs. In particular, $\Psi_i$ and $\Phi_i$ define the source and target alignment indices of the $i^{th}$ pair, respectively. Then, the capability of the cross-lingual transfer ability can be interpreted as the sum of an importance score between the aligned source tokens and target tokens as follows:

$$\Sigma_{i=1}^{|\Psi|} \{\Sigma_{p \in \Psi_i} u_p \times \Sigma_{q \in \Phi_i} v_p\};$$

Where $u_p$ and $v_p$ represent the importance score of the $p^{th}$ token of source and target language, respectively.

The final result is a score that reflects the capability of the cross-lingual transfer ability.

Figure 2:
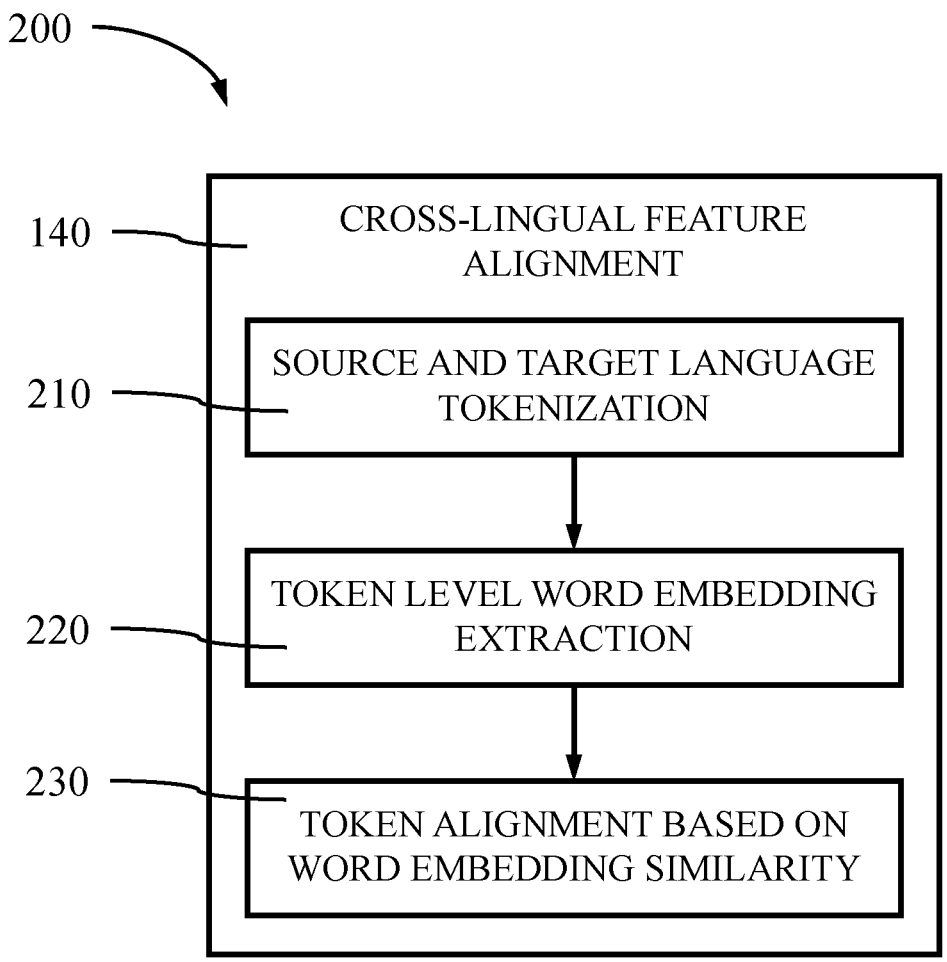
FIG. 2 is a block/flow diagram illustrating a system/method for cross-lingual feature alignment, in accordance with an embodiment of the present invention.

Referring now to FIG. 2, a block/flow diagram illustrating a system/method for cross-lingual feature alignment is shown, in accordance with an embodiment of the present invention; and In one or more embodiments, a system method for cross-lingual feature alignment 200 can aligned tokens in the source language to tokens in the target language for both the premise and the hypothesis statements based on the semantic similarity of the tokens in each language.

At block 210, the sentences of hypothesis and premise can be tokenized in both source and target language. The tokenizer allows support of multiple languages.

In various embodiments, the hypothesis and premise can be formatted as: [Tokens of premise]<SEP> [Tokens of hypothesis]. Each token in a premise and a hypothesis can be assigned an importance score to indicate the contribution of the feature to the final output.

At block 220, the word embeddings of each token are extracted from block 210. As a low-dimensional feature vector, the word embedding can represent the semantics of tokens for both the hypothesis and the premise. The word embedding is extracted from a pre-trained multi-lingual word embedding library, called the fasttext. It supports 157 languages and is trained by continuous bag of words (CBOW) and has position weights in 300 dimensions.

At block 230, the tokens can be aligned between the hypothesis of source language and target language and the premise of source language and target language. A linear programming method can be used to minimize the information loss with the alignment flow.

Figure 3:
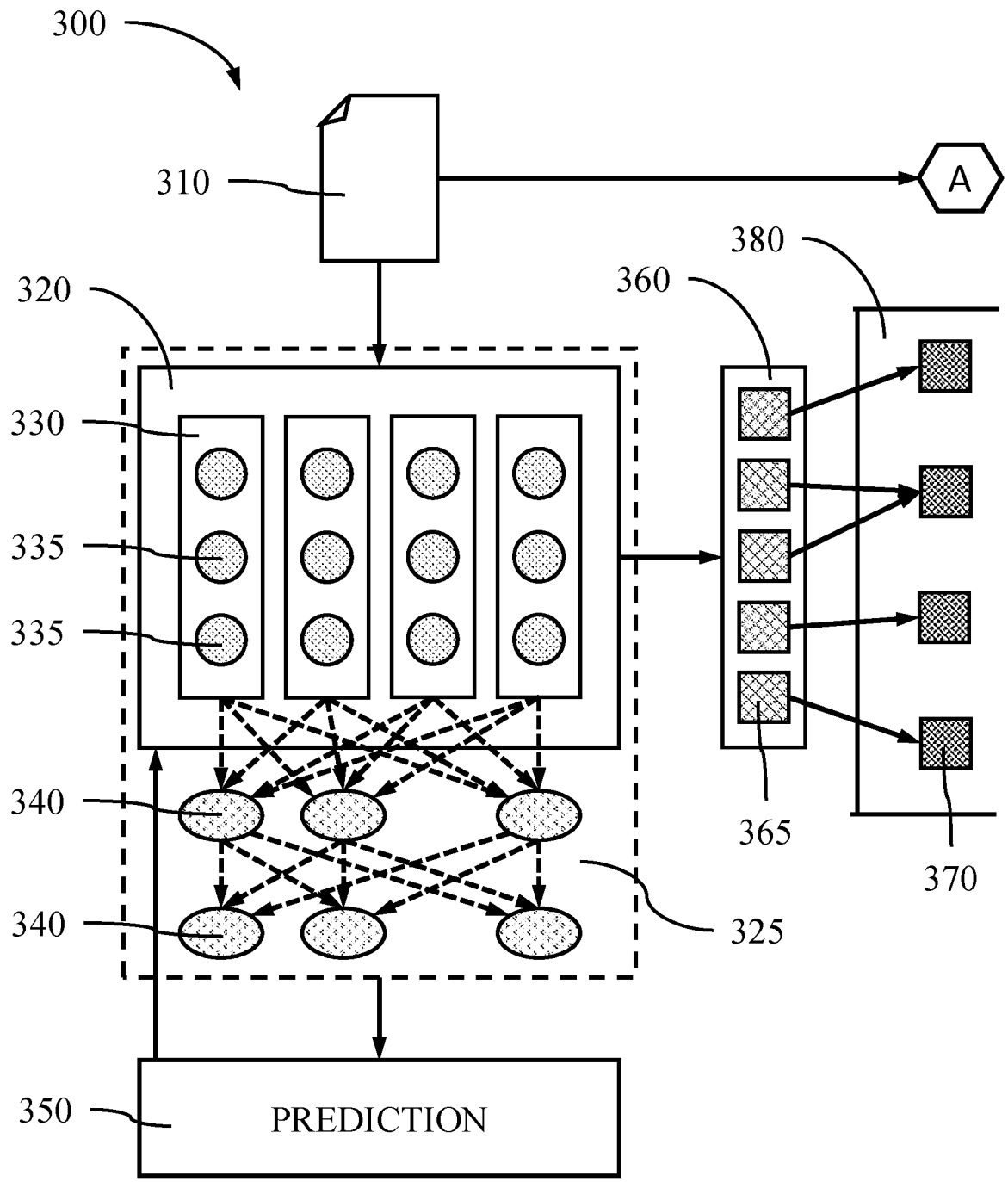
FIG. 3 is a flow diagram illustrating a portion of a system/method for elements in the cross-lingual model architectures which produce transferability across languages, in accordance with an embodiment of the present invention.

FIG. 3 is a flow diagram illustrating a portion of a system/method for elements in the cross-lingual model architectures which produce transferability across languages, in accordance with an embodiment of the present invention.

In one or more embodiments, a cross-lingual model architecture 300 which produce transferability across languages is provided.

In various embodiments, a corpus 310 for a source language can be provided to the system/method architecture for attribution transferability. The corpus 310 can be in a single source language to be used for generation of statements in a target language, where only source language training data may be provided. The input of a cross-lingual model is a vector of token IDs, which are non-differentiable. This is the input for an embedding layer.

In various embodiments, the source corpus 310 can be fed into an embedding layer 320 to generate word embeddings for the source language from the source statements. The embedding layer 320 provides meaningful encoding information of token IDs. The word embeddings can be fed into nodes 340 of a multilingual transformer 325. The circles and boxes represent the dimensions of the token embeddings.

The multi-lingual transformer can provide a prediction 350 that can be fed back into the embedding layer 320 to generate the output. The prediction can be used to generate layer attributions.

In various embodiments, the embedded words can be fed into token attributor 360 that computes the token-level attribution scores. Layer aggregation can be used for the input to the token attributor 360, and the token attributor 360 can provide token alignment between the source language and the target language.

Figure 4:
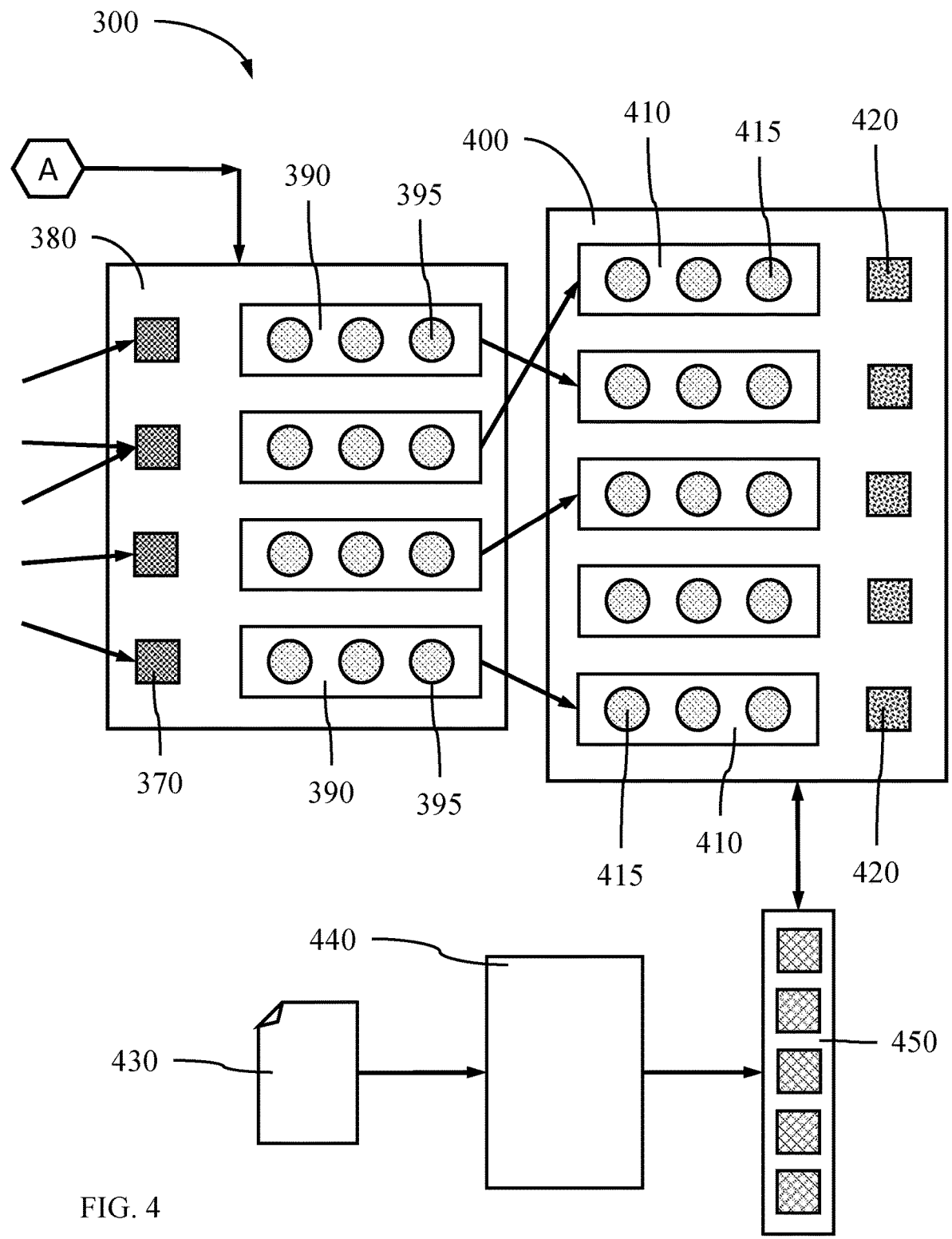
FIG. 4 is another flow diagram illustrating another portion of the system/method for elements in the cross-lingual model architectures which produce transferability across languages, in accordance with an embodiment of the present invention.

FIG. 4 is a flow diagram illustrating another portion of the system/method for elements in the cross-lingual model architectures which produce transferability across languages, in accordance with an embodiment of the present invention.

In various embodiments, a Consistency of Token Attributions (CCTA) evaluation framework 300 can provide that all tokens are aligned into a common comparable embedding space.

A word attributor 380 can generate word attributions, and a word embedder 390 can provide word embeddings through hidden layers of nodes 395.

Cross-Lingual Feature Alignment can be performed, where the alignment can be based on the semantic similarity between tokens generated by the attributor 360 for the source language and the target language.

An attribution transfer 400 can be conducted to provide aligned word embeddings using multi-lingual PLMs with word attributors 410 and nodes 415.

A token alignment to the target language corpus 430 can be conducted using a multilingual transformer 440 that can be fed to the token attributor 450, and the token attributor 450 can provide token alignment between the source language and the target language with the attribution transfer 400. Embeddings of tokens can be aligned with similar semantics by the cosine similarity metric.

The attribution mapping is to measure the consistency of the token attributions via optimizing the attribute scores between source and target language. Given any parallel texts, the state-of-the-art Layer based Integrated Gradients (LIG) is applied to quantify token attributions. In contrast with previous attribution methods, LIG follows the axioms of attribution methods and tease apart errors from the misbehaviors of multi-lingual PLMs. It measures how the input gradient is changed by a relative path, and therefore needs a reference (i.e. baseline). Given an input vector:

x∈ $\mathbb{R}^d$, its baseline, x'∈ $\mathbb{R}^d$, which is the starting point of the path from x' to x, and a prediction function F, the change of gradient ∂F/∂x along the path, x'→x, is shown as follows:

$$LIG_i(x) = (x - x') \times \int_{\alpha=0}^{1} \frac{\partial F(x' + \alpha(x - x'))}{\partial x} d\alpha;$$

where xi is the i-th dimension of x. Obviously, as a increases from 0 to 1, the path starts from x' to x, and LIG integrates the gradient ∂F/∂x along the path. This requires the differentiability of F. Unfortunately, the input of a multilingual PLM is a sequence of non-differentiable token IDs. To address this issue, the embedding layer of a multi-lingual PLM is chosen to be an origin as the input and all embedding attributions are aggregated. The baseline in Equation (1) is chosen as follows: we leave separation tokens and replace other tokens with padding tokens in any sentence. Let d be the dimensionality of the embedding layer, given a parallel text (s, t), where $s_i$ and $t_j$ are the i-th and j-th tokens of sentences s and t, respectively, attributions are aggregated mathematically as follows:

$$w_{s_i} = \Sigma_{k=1}^{d} LIG_k(s_i), \; w_{t_j} = \Sigma_{k=1}^{d} LIG_k(t_j).$$

where $w_{s_i}$ and $w_{t_j}$ are attributions of $s_i$ and $t_j$, respectively. Namely, the attributions of tokens $s_i$ and $t_j$ are the sum of their attributions along the dimensionality of the embedding layer.

Multi-lingual PLMs usually provide contextual embeddings, which are mapped in different semantic spaces. In order to bridge the semantic gap, token embeddings are aligned to a shared context-free semantic space. Let $e_{s_i}$ and $e_{t_j}$ be denoted as embeddings of $s_i$ and $t_j$ in such a shared semantic space, respectively, then the semantic similarity between them is measured by the cosine similarity, which is shown as follows:

$$sim(s_i, t_j) = \frac{e_{s_i} T e_{t_j}}{\|e_{s_i}\| \|e_{t_j}\|},$$

where T is the transpose of the vector.

The Earth mover's similarity is used to measure the consistency of token attributions between a source language and a target language. It is obtained by optimizing a linear programming problem as follows:

$$C(s,t) = \max \Sigma_{i=1, s_i \in s}^{L} \Sigma_{j=1, t_j \in t}^{L} f_{i,j} \; sim(s_i, t_j);$$

$$\text{s.t.} \; \Sigma_{j=1}^{L} f_{i,j} \leq \bar{w}_{s_i} (i=1, \ldots, L);$$

$$\Sigma_{i=1}^{L} f_{i,j} \leq \bar{w}_{t_j} (j=1, \ldots, L), f_{i,j} \geq 0; \quad (2),$$

where s.t. means "subject to", it's usually used to provide some constraints for optimization problem; where C(s, t) is the consistency of token attributions, and L is the maximal length of sentences, s and t. $\bar{w}_{s_i}$ and $\bar{w}_{t_j}$ are denoted as the normalized values of $w_{s_i}$ and $w_{t_j}$, respectively, or namely $\Sigma_{s_i \in s} \bar{w}_{s_i} = 1, \bar{w}_{s_i} \geq 0, \Sigma_{t_j \in t} \bar{w}_{t_j} = 1, \bar{w}_{t_j} \geq 0$.

The weight $f_{i,j}$ quantifies the consistency of token attributions from $s_i$ to $t_j$. The larger C(s, t) is, the more likely multi-lingual PLMs attach equal importance to multi-lingual synonyms. The equation can be efficiently optimized by a standard linear programming solver.

All tokens are aligned into a common comparable embedding space.

The same can be done with the target language corpus.

Figure 5:
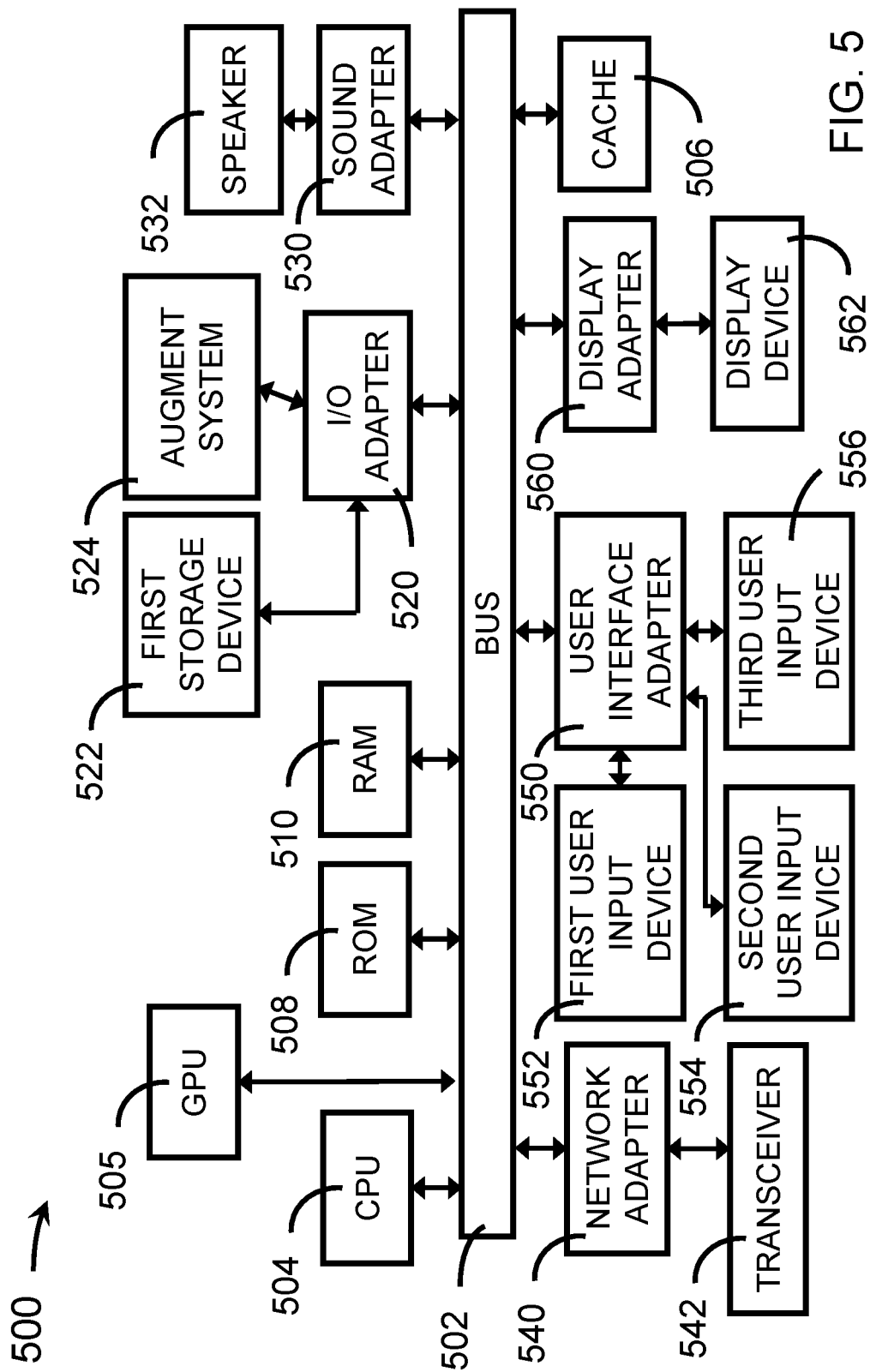
FIG. 5 is an exemplary processing system to which the present methods and systems may be applied, in accordance with an embodiment of the present invention.

FIG. 5 is an exemplary processing system to which the present methods and systems may be applied, in accordance with an embodiment of the present invention.

The processing system 500 can include at least one processor (CPU) 504 and may have a graphics processing (GPU) 505 that can perform vector calculations/manipulations operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and/or a display adapter 560, can also be operatively coupled to the system bus 502.

A first storage device 522 and a second storage device 524 are operatively coupled to system bus 502 by the I/O adapter 520, where a recurrent neural network for an evaluation framework can be stored for implementing the features described herein. The storage devices 522 and 524 can be any of a disk storage device (e.g., a magnetic or optical disk storage device), a solid state storage device, a magnetic storage device, and so forth. The storage devices 522 and 524 can be the same type of storage device or different types of storage devices. A Cross-lingual Transfer Interpretation (CTI) system/method 100 can be stored in the storage device 524 and implemented by the at least one processor (CPU) 504 and/or the graphics processing (GPU) 505.

A speaker 532 can be operatively coupled to the system bus 502 by the sound adapter 530. A transceiver 542 can be operatively coupled to the system bus 502 by the network adapter 540. A display device 562 can be operatively coupled to the system bus 502 by display adapter 560.

A first user input device 552, a second user input device 554, and a third user input device 556 can be operatively coupled to the system bus 502 by the user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 can be used to input and output information to and from the processing system 500.

In various embodiments, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Moreover, it is to be appreciated that system 500 is a system for implementing respective embodiments of the present methods/systems. Part or all of processing system 500 may be implemented in one or more of the elements of FIGS. 1-4. Further, it is to be appreciated that processing system 500 may perform at least part of the methods described herein including, for example, at least part of the method of FIGS. 1-4.

Figure 6:
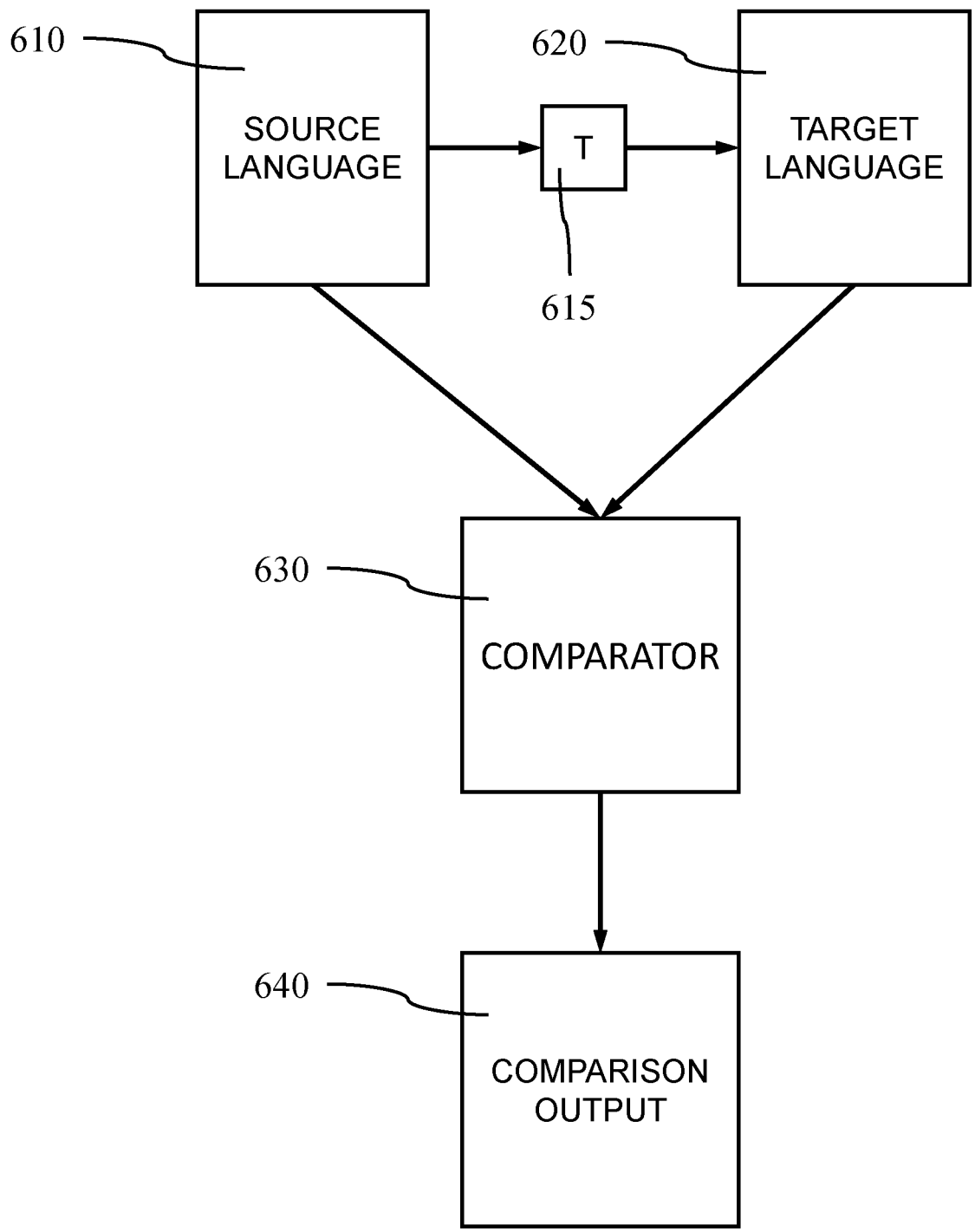
FIG. 6 is a block/flow diagram illustrating a high-level system/method for Cross-lingual Transfer Interpretation (CTI), in accordance with an embodiment of the present invention.

FIG. 6 is a block/flow diagram illustrating a high-level system/method for Cross-lingual Transfer Interpretation (CTI), in accordance with an embodiment of the present invention.

In one or more embodiments, a comparator 630 and/or translator 615 can be implemented on a mobile device (e.g., smart phone, tablet, laptop computer, etc.) utilizing a processor and memory of the device storing an evaluation framework to measure the transfer score of attributions for a source language 610 and a target language 620 by aligning attributions of tokens with similar semantics for NLP tasks of interest from the source language and the target language.

In various embodiments, a translator 615, which translates the source language to a target language, can generate sentences for the target language 620 from the source language 610. The comparator 630 can analyze the semantic similarity of the sentences in the target language 620 to the source language 610, and generate a comparison output 640 based on a token alignment for the source language 610 and the target language 620, and a qualitative analysis for presentation to a user on a device display, which a user can compare to a performance threshold to determine whether the translator 615 performs satisfactorily.

Embodiments described herein may be entirely hardware, entirely software or including both hardware and software elements. In an embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for Cross-lingual Transfer Interpretation (CTI), comprising:
  receiving text corpus data including premise-hypothesis pairs with a relationship label in a source language;
  conducting a source to target language translation;
  performing a feature importance extraction, where an integrated gradient is applied to assign an importance score to each input feature;
  performing a cross-lingual feature alignment, where tokens in the source language are aligned with tokens in the target language for both the premise and the hypothesis based on semantic similarity; and
  performing a qualitative analysis, where the importance score of each token can be compared between the source language and the target language according to a feature alignment result.

2. The computer implemented method of claim 1, further comprising tokenizing sentences of the hypothesis and the premise of the premise-hypothesis pairs for both the source and the target languages to generate tokens for the hypothesis of source language and target language and the premise of source language and target language.

3. The computer implemented method of claim 2, further comprising extracting word embeddings for each token.

4. The computer implemented method of claim 3, further comprising aligning the tokens generated for the hypothesis of source language and target language and the premise of source language and target language.

5. The computer implemented method of claim 4, wherein the tokens are aligned using a linear programming method.

6. The computer implemented method of claim 5, wherein the qualitative analysis includes measuring the consistency of token attributions between the source language and the target language by optimizing a linear programming problem, $C(s,t) = \max \Sigma_{i=1, s_i \in s}^{L} \Sigma_{j=1, t_j \in t}^{L} f_{i,j} \, sim(s_i, t_j)$;
$\Sigma_{i=1}^{L} f_{i,j} \geq \overline{W}_{t_j} (j=1, \ldots, L)$, $f^{i,j} \geq 0$; (2), where s.t. means "subject to", C(s, t) is the consistency of token attributions, L is the maximal length of sentences, s and t, $\overline{W}_{s_i}$ and $\overline{W}_{t_j}$ are denoted as the normalized values of $w_{si}$ and $w_{tj}$, respectively, or namely $\Sigma_{s_i \in s} \overline{w}_{s_i} = 1, \overline{w}_{s_i} \geq 0, \Sigma_{t_j \in t} \overline{w}_{t_j} = 1, \overline{w}_{t_j} \geq 0$.

7. The computer implemented method of claim 6, wherein the semantic similarity between the tokens in the source language and the tokens in the target language for both the premise and the hypothesis is measured using the cosine similarity, $$sim(s_i, t_j) = \frac{e_{s_i}^T e_{t_j}}{\|e_{s_i}\| \|e_{t_j}\|},$$

where T is the transpose of the vector, and where $e_{si}$ and $e_{tj}$ are embeddings of $s_i$ and $t_j$ in such a shared semantic space.

8. The computer implemented method of claim 7, further comprising a user judging an output generated by the Cross-lingual Transfer Interpretation, and deciding whether to use a multi-lingual transformer model for the target language and the source language in a real-world application.

9. A computer system for Cross-lingual Transfer Interpretation (CTI), comprising:
  a processor;
  a display operatively coupled to the processor;
  computer memory operatively coupled to the processor; and
  a comparator stored in the computer memory, wherein the comparator is configured to receive text corpus data including premise-hypothesis pairs with a relationship label in a source language;
  conduct a source to target language translation;
  perform a feature importance extraction, where an integrated gradient is applied to assign an importance score to each input feature;

perform a cross-lingual feature alignment, where tokens in the source language are aligned with tokens in the target language for both the premise and the hypothesis based on semantic similarity, wherein the semantic similarity is measured using the cosine similarity, $$sim(s_i, t_j) = \frac{e_{s_i}{}^T e_{t_j}}{\|e_{s_i}\| \|e_{t_j}\|},$$

where T is the transpose of the vector, and where $e_{si}$ and $e_{tj}$ are embeddings of $s_i$ and $t_j$ in such a shared semantic space; and perform a qualitative analysis, where the importance score of each token can be compared between the source language and the target language according to a feature alignment result.

10. The computer system of claim 9, wherein the qualitative analysis includes measuring the consistency of token attributions between the source language language and the target language by optimizing a linear programming problem, $C(s,t) = \max \Sigma_{i=1, s_i \in s}^{L} \Sigma_{j=1, t_j \in t}^{L} f_{i,j} \, sim(s_i, t_j)$; $\Sigma_{i=1}^{L} f_{i,j} \geq \overline{W}_{t_j} (j=1, \ldots, L), f^{i,j} \geq 0$; (2), where s.t. means "subject to", C(s, t) is the consistency of token attributions, L is the maximal length of sentences, s and t, $\overline{W}_{s_i}$ and $\overline{W}_{t_j}$ are denoted as the normalized values of $w_{si}$ and $w_{tj}$, respectively, or namely $\Sigma_{s_i \in s} \overline{w}_{s_i} = 1, \overline{w}_{s_i} \geq 0, \Sigma_{t_j \in t} \overline{w}_{t_j} = 1, \overline{w}_{t_j} \geq 0$.

11. The computer system of claim 10, wherein the tokens are aligned using a linear programming method.

12. The computer system of claim 11, further comprising a user judging an output generated by the Cross-lingual Transfer Interpretation, and deciding whether to use a multi-lingual transformer model for the target language and the source language in a real-world application.

\* \* \* \* \*